UNITED STATES PATENT OFFICE.

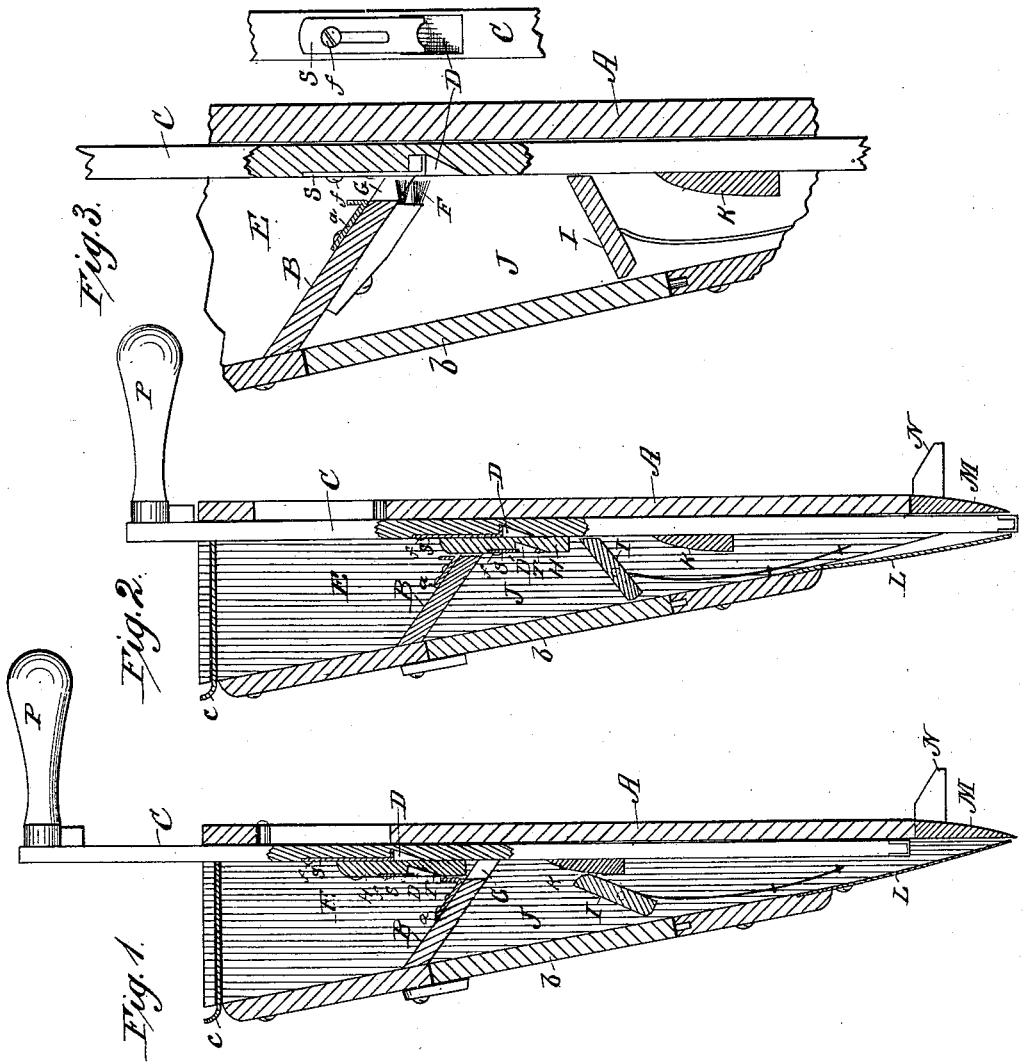

CHARLES CHRISTIAN KIERULFF, OF STARKE, FLORIDA.

PLANTER.

SPECIFICATION forming part of Letters Patent No. 332,089, dated December 8, 1885.

Application filed July 11, 1885. Serial No. 171,404. (No model.)

*To all whom it may concern:*

Be it known that I, CHARLES CHRISTIAN KIERULFF, a citizen of the United States, residing at Starke, in the county of Bradford and State of Florida, have invented certain new and useful Improvements in Planters, of which the following is a description.

This invention relates to that class of seed-planters which are carried and operated by hand; and its object is to provide means whereby holes may be made in the ground and cotton-seed, corn, and other similar seeds may be dropped therein mechanically.

To this end my invention consists in the construction and combination of parts hereinafter described and claimed, reference being had to the accompanying drawings, in which—

Figure 1 is a central vertical section of my planter with the slide drawn up to receive seed and fitted for planting cotton-seed. Fig. 2 shows the same with the slide pushed down as in the act of dropping seed. Fig. 3 is a detail of the same device adapted to plant corn or other grain.

A represents the body of the machine, consisting of a light wooden box tapering from its top downward on all sides, forming an edge like a spade at the lower end.

B is a partition slanting backward to guide the seed, which is carried in the box above it to the back of the box.

C is the gate fitted to slide vertically in a groove in the inner face of the back. This gate is provided with a pocket, D, Fig. 3, into which corn will enter when the gate is raised, so as to bring the pocket into the chamber E. A charge of seed enough for one hill received in the pocket is carried under the partition by the descending slide, and a brush, F, is fixed at the under side of the partition to permit the passage of any kernels of corn which are partly in the pocket and partly projecting from it. If the edge of the partition came rigidly down to the face of the gate, any such kernels would stop the gate; but the partition has an aperture or gateway, G, over the sliding gate, which is closed by the brush only when the machine is fitted for planting corn, &c., and which serves as a passage for a block, H, when the machine is fitted for planting cotton-seed, as hereinafter described. That portion, J, of the box below partition B, I call the "chute."

I is a door pivoted in the chute to temporarily arrest the charge of falling seed at each downward passage of the slide.

K is a wedge secured on the slide to open the door as the slide passes upward.

L is another door adapted to again arrest the passage of each charge of seed. The doors I and L are both closed by springs. The door L may be made of elastic sheet metal secured to the box across its delivery, or it may be of non-elastic material pivoted to the box and actuated by a spring.

M is a spade to be thrust into the ground in the act of planting each hill.

N is a shoulder serving as a stop-gage, permitting the spade to enter the ground only a fixed distance. This distance is regulated by a slot and screw-bolt, O, in the gage, by means of which the gage may be set higher or lower.

In service the spade is directed to the spot where a hill is required and the slide C is driven quickly downward by means of the handle P. This first drive deposits a charge of seed on the door I. Now, the slide is to be drawn up to get another charge of seed, and in so doing the wedge K opens the door I, permitting the charge to fall upon door L. Now, without having moved the spade the slide is to be a second time driven down. This deposits a new charge on the door I and opens the door L, permitting the first charge to escape into the ground. The lower end of the slide projects beyond the spade at each drive, forming a hole into which the seed will fall when the planter is raised. Each successive movement of the slide will now deliver a charge of seed, so that a hill may be planted at every thrust of the planter into the ground.

Owing to the fuzzy nature of cotton-seed a corn-planter will not generally plant it well, as it does not readily fall into the charging-pocket. I therefore combine with my slide the block H, which is removably secured thereto by screws R. This block is provided with a pocket, D', similar to the pocket D, to receive a charge of cotton-seed. Each of the pockets D and D' is provided with a gage, S, which is adapted to form one end of the pocket, and is slotted and secured by a screw, $f$, so that it may be set along to make the pocket larger or smaller as the charge of seed is desired to be more or less. At the forward end of the cotton-seed-charger pocket I place sharp spurs T, pointed outward to catch the lint when there is any, and pull the seed attached thereto into the pocket.

The object in placing the charger-pocket in the block H upon the slide-gate is to project the charger into the cotton-seed to insure the seed crowding into the pocket, for cotton-seed has a tendency to ball up and cling together. To part the seed in the pocket from the ball of seed I arm the partition at the discharge-opening with a thin metallic lip, *a*, which projects into the seed-chamber. Nearly in contact with the pocket-face of the slide *b* is a lid of the box A, which may be removed to give access to the chute. *c* is the top lid of the seed-chamber, fitted to slide in at one side. When the block H is used, the brush F is to be removed.

Having thus fully described my invention, what I claim, and desire to secure by Letters Patent, is—

1. The combination, with the box A, grooved in the inner face of its back and provided with a partition, B, secured within the box, and having an aperture, G, at one edge registering with the said groove, and a chute, J, of a gate, C, provided with a pocket, D, and adapted to extend entirely through and project from the box A at each end thereof, the brush F, fitted to cover the said aperture G in the partition B, the door I, pivoted across the chute J and provided with a closing-spring, the wedge K, secured upon the gate C, to act upon the door I, and the door L, attached at its upper edge to the box and adapted to be opened by the gate C, and provided with a closing-spring, substantially as shown and described.

2. The combination of the box A, grooved in the inner face of its back, and provided with a partition having the aperture G against the said slot, the gate C, fitted to slide in the said slot, the block H, removably secured upon the gate and having the pocket D', substantially as shown and described.

3. The combination of the box A, grooved in the inner face of its back and provided with a partition having the aperture G, the block H, removably secured upon the gate and having the pocket D', and the thin lip *a*, secured to the partition directly over the said aperture, substantially as shown and described.

CHARLES CHRISTIAN KIERULFF.

Witnesses:
L. D. WALL,
J. T. WILLS.